United States Patent
Russell

(10) Patent No.: US 10,878,679 B2
(45) Date of Patent: Dec. 29, 2020

(54) UNMANNED AERIAL VEHICLES

(71) Applicant: Iain Matthew Russell, London (GB)

(72) Inventor: Iain Matthew Russell, London (GB)

(*) Notice: Subject to any disclaimer, the term of this patent is extended or adjusted under 35 U.S.C. 154(b) by 193 days.

(21) Appl. No.: 16/048,402

(22) Filed: Jul. 30, 2018

(65) Prior Publication Data

US 2019/0035128 A1 Jan. 31, 2019

(30) Foreign Application Priority Data

Jul. 31, 2017 (GB) .................. 1712307.6
Feb. 7, 2018 (GB) .................. 1801989.3

(51) Int. Cl.

| | | |
|---|---|---|
| *G08B 13/196* | (2006.01) | |
| *G06K 9/00* | (2006.01) | |
| *H04N 7/18* | (2006.01) | |
| *B64C 39/02* | (2006.01) | |
| *H04N 1/44* | (2006.01) | |

(52) U.S. Cl.
CPC ...... *G08B 13/19686* (2013.01); *B64C 39/024* (2013.01); *G06K 9/00637* (2013.01); *G06K 9/00771* (2013.01); *H04N 1/448* (2013.01); *H04N 7/18* (2013.01); *H04N 7/185* (2013.01); *B64C 2201/123* (2013.01); *G06T 2207/30232* (2013.01)

(58) Field of Classification Search
CPC ........ G08B 13/19686; G08B 13/19652; G06K 9/00771; G06K 9/0063; G06K 9/00637; B64C 2201/127
See application file for complete search history.

(56) References Cited

U.S. PATENT DOCUMENTS

| | | | | |
|---|---|---|---|---|
| 7,161,615 | B2 * | 1/2007 | Pretzer | G08B 13/19686 348/143 |
| 8,107,680 | B2 * | 1/2012 | Henson | G08B 13/19604 382/103 |
| 9,536,154 | B2 * | 1/2017 | Skans | G06K 9/2054 |
| 9,648,285 | B2 * | 5/2017 | Traff | H04N 5/33 |
| 9,940,525 | B2 * | 4/2018 | Wolf | G06K 9/00771 |
| 10,162,059 | B2 * | 12/2018 | Ashoori | G01S 19/48 |
| 2006/0007310 | A1 * | 1/2006 | Shih | G08B 13/19686 348/143 |
| 2008/0211903 | A1 * | 9/2008 | Davey | G06K 9/00771 348/39 |
| 2009/0128632 | A1 * | 5/2009 | Goto | G01S 3/7864 348/169 |

(Continued)

FOREIGN PATENT DOCUMENTS

| | | | | |
|---|---|---|---|---|
| JP | 2005286468 A | * | 10/2005 | ....... G08B 13/19686 |
| JP | 2016171441 A | * | 9/2016 | |
| KR | 20150137891 A | * | 12/2015 | |

*Primary Examiner* — John Villecco

(57) ABSTRACT

A UAV comprises a camera and an image processor. The camera is operable to output captured image data corresponding to a first representation of a scene within a field of view of the camera. The scene includes an item. The image processor is configured to receive the captured image data. The image processor is configured, in response to recognising a predetermined object indicative of the presence of the item in the first representation, to generate image data corresponding to a second, different representation of the scene. A part of the scene that is associated with the item in the first representation is represented differently in the first and second representations. The image processor is configured to output the generated image data.

17 Claims, 4 Drawing Sheets

(56) References Cited

U.S. PATENT DOCUMENTS

| | | | |
|---|---|---|---|
| 2010/0328460 A1* | 12/2010 | Merkel | G08B 13/19652 348/143 |
| 2011/0096922 A1 | 4/2011 | Oya | |
| 2011/0150327 A1* | 6/2011 | Yoo | G06T 1/00 382/165 |
| 2013/0021433 A1* | 1/2013 | Belsarkar | H04N 7/181 348/36 |
| 2014/0140575 A1 | 5/2014 | Wolf | |
| 2014/0334676 A1* | 11/2014 | Skans | G08B 13/19652 382/103 |
| 2014/0368646 A1* | 12/2014 | Traff | H04N 5/33 348/143 |
| 2015/0049912 A1* | 2/2015 | Migdal | G06K 9/00771 382/103 |
| 2015/0145992 A1* | 5/2015 | Traff | G06T 11/60 348/143 |
| 2015/0269258 A1* | 9/2015 | Hunt, Jr. | G06F 16/951 707/770 |
| 2016/0133019 A1 | 5/2016 | Wagner | |
| 2016/0286175 A1 | 9/2016 | Dvorak | |
| 2017/0220816 A1* | 8/2017 | Matusek | G06F 21/6245 |
| 2017/0300757 A1* | 10/2017 | Wolf | G06K 9/00771 |
| 2018/0025473 A1* | 1/2018 | Contreras | G01C 21/00 348/144 |
| 2018/0025649 A1* | 1/2018 | Contreras | G01C 21/00 701/3 |
| 2018/0136659 A1* | 5/2018 | Matloff | H04N 5/232 |
| 2018/0174414 A1* | 6/2018 | Edpalm | H04N 19/176 |
| 2018/0189516 A1* | 7/2018 | Browning | G06F 21/32 |
| 2018/0232580 A1* | 8/2018 | Wolf | G06K 9/00771 |
| 2018/0330591 A1* | 11/2018 | Tilkin | H04N 7/18 |
| 2019/0197254 A1* | 6/2019 | Salgar | G06K 9/00771 |
| 2019/0362473 A1* | 11/2019 | Scott | H04N 5/23238 |
| 2020/0053256 A1* | 2/2020 | Yoshimura | G05D 1/0033 |

* cited by examiner

UNMANNED AERIAL VEHICLES

CROSS-REFERENCE TO RELATED APPLICATIONS

This application claims priority under 35 U.S.C. § 119(a) to UK Patent Application Nos. GB1712307.6, filed on Jul. 31, 2017, and GB1801989.3, filed on Feb. 7, 2018. The entire content of each of these patent applications is hereby incorporated by reference.

FIELD

This disclosure relates to unmanned aerial vehicles (UAVs). In particular, but not exclusively, this disclosure relates to UAVs, methods of controlling UAVs, computer programs, image processors for use with UAVs and systems comprising UAVs.

BACKGROUND

A UAV, which may be known as a 'drone' or an 'unmanned aircraft system (UAS)', is an aircraft that does not have a human pilot aboard.

Some known UAVs have one or more cameras that can capture an image of a scene within the field of view of the camera(s). With the proliferation of such UAVs, however, comes privacy concerns, for example where the image is captured without knowledge and/or consent of a person in the scene. Images captured by UAVs may lead to privacy and/or security and/or other related concerns in other scenarios, for example even where the captured image does not represent a person.

It would therefore be desirable to provide a UAV that allows for enhanced privacy and/or security and/or the like.

BRIEF DESCRIPTION OF FIGURES

Various features will now be described, by way of example only, with reference to the accompanying drawings in which.

DETAILED DESCRIPTION

Figure 1:
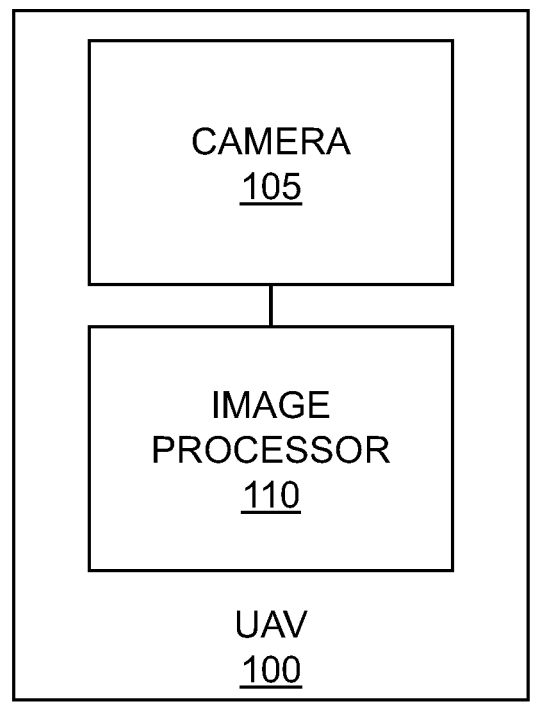
FIG. 1 shows a block diagram of an example UAV in accordance with embodiments.

A UAV may have a camera that outputs captured image data (for example still image data and/or video data) corresponding to a first representation of a scene within a field of view of the camera. The scene includes one or more windows. The window(s) may be in a building, in a vehicle or in another object. A person and/or another object may be represented in the captured image data where, for example, they are behind the window. This presents a potential privacy concern, since the person may not have knowledge of, and/or may not have consented to, their representation in the captured image data. Data privacy is becoming a particular concern for many individuals (for example in terms of identity theft) and for enterprises (for example in terms of how personally identifiable information is handled). This is particularly, but not exclusively, applicable where a person is in their own home and expects a degree of privacy in such a location. However, this can also apply if the person is at work, in a shop, in a school, in a car, in a greenhouse, in a restaurant, etc.

In examples described herein, an image processor is provided (for example in the UAV) that receives the captured image data output by the camera. The image processor generates image data corresponding to a second, different representation of the scene. A part of the scene that is visible through the window in the first representation of the scene is represented differently in the first and second representations of the scene, for example to enhance privacy. The image processor may generate the image data corresponding to the second representation of the scene by modifying the captured image data corresponding to the first representation of the scene (for example using a pixilation technique) and/or by combining data (for example overlay data) with the captured image data corresponding to the first representation of the scene.

As such, a person, and/or other object, that is visible through the window in the first representation of the scene may be represented differently in the second representation of the scene. The presence of the person may or may not be apparent from the second representation of the scene. For example, the person may be omitted from the second representation of the scene, may be obscured in the second representation of the scene (for example by pixelating and/or blurring the representation of the person) and/or may be covered by or replaced with other content (for example a silhouette of the person) in the second representation of the scene. More generally, any part or parts of the scene that are visible through the window in the first representation of the scene may be represented differently in the second representation of the scene. Representing the part of the scene that is visible through the window differently in this way may result in increased privacy in relation to that part of the scene. In some examples, all of the scene that is visible through the window in the first representation is represented differently in the second representation of the scene. This can provide relatively strong privacy enhancement. In some examples, only part of the scene that is visible through the window in the first representation is represented differently in the second representation of the scene. This can allow, for example, a portion of the scene that is visible through the window and that does not have associated privacy concerns to be represented in the second representation and a portion of the scene that is visible through the window and that does have associated privacy concerns to be represented in the second representation. This may be the case, for example, where there is a large window, where one or more people visible through the window have consented to being represented in image data, and where one or more other people visible through the window have not consented to being represented in the image data.

Such increased privacy may be provided within the UAV by the image processor such that image data has already been subject to privacy enhancement before it is communicated outside the UAV. This may provide enhanced security in that the image data has privacy enhancement applied to it before it leaves the UAV where it may potentially be intercepted.

Such increased privacy may, alternatively or additionally, be provided outside the UAV. This may enable the UAV to be less complicated and/or expensive to manufacture, but may involve the use of additional security measures (for example encrypted data communications channels and/or digital certificates) to provide a desired degree of security in relation to any transmitted data.

Although some examples described below relate to providing privacy enhancement in relation to part of a scene that is visible through a window, other examples are described. More generally, such techniques may be applied in relation to image data corresponding to a first representation of a scene within a field of view of a camera, where the scene indicates any one or more items. A window is an example of such an item, but other example items described below include billboards, schools, government facilities, private property, children, graphic content, payment cards etc. An image processor is configured to receive the captured image data output by the camera and, in response to recognising a predetermined object indicative of the presence of the item in the first representation of the scene, generate image data corresponding to a second, different representation of the scene. A part of the scene that is associated with the item in the first representation of the scene is represented differently in the first and second representations of the scene. The part of the scene may be associated with the item in various different ways. For example, where the item is a window, the part of the scene may be visible through the window. In such an example, the part of the scene is associated with the window by virtue of being visible through the window. In another example, where the item is a payment card, the part of the scene may be identification information visible on the payment card. In such an example, the part of the scene is associated with the payment card by virtue of being visible on the payment card. The image processor outputs the generated image data.

Referring to FIG. 1, there is shown schematically an example of a UAV 100.

The UAV 100 may be operable in one or more operating modes. Different operating modes may have different levels (or 'degrees' or 'measures') of autonomy. For example, the UAV 100 may be temporarily or permanently operable in a non-autonomous mode as a remotely piloted aircraft, where the UAV 100 is under the control of a remote human operator. The UAV 100 may be temporarily or permanently operable in a fully autonomous mode, where the UAV 100 is fully under the control of one or more on-board computing systems of the UAV 100. The UAV 100 may be temporarily or permanently operable in one or more intermediate modes, with one or more intermediate levels of autonomy between these two extremes. The UAV 100 may be configured to perform one or more of the techniques described wherein while the UAV 100 operates in an autonomous mode. For example, the UAV 100 may be configured to perform privacy-enhanced image processing while the UAV 100 operates in an autonomous mode. This may be effective where, for example, a human operator is not available to make privacy-related decisions and/or observations. For example, while a human operator may know, or at least suspect, that the UAV 100 is approaching a location where privacy may be a consideration and may, for example, avoid that location, if the UAV 100 operates in an autonomous mode, the UAV 100 may not be aware of this. Nevertheless, even if the UAV 100 strays into such a location, the techniques described herein provide a degree of privacy.

The UAV 100 comprises a camera 105. In this specific example, the UAV 100 comprises a single camera 105, but in other examples the UAV 100 comprises more than one camera. The UAV 100 may comprise one or more different types of camera. The camera 105 may be arranged to capture visible light, infrared etc.

The camera 105 may, in some examples, comprise a forward-facing camera, a sideways-facing camera and/or a backward-facing camera. As such, the camera 105 may comprise one or more individual camera components. Forward-facing, sideways-facing and backward-facing cameras differ from downward-facing and upwards-facing cameras in that a downward-facing camera captures an aerial (or 'birds-eye') view of a scene directly below a UAV comprising such a camera and an upwards-facing camera captures a view of a scene directly above a UAV comprising such a camera, whereas forward-facing, sideways-facing and backward-facing cameras capture a view of a scene in front of, to the side of, and behind, a UAV respectively comprising such a camera. Forward-facing, sideways-facing, and backwards-facing cameras may be more likely to capture image data representing a scene comprising a window than downward-facing and upwards-facing cameras. This is because windows are generally provided on the sides of objects (such as cars and buildings) as opposed to being on the top of, or below, such objects. Windows are sometimes present on the top of objects, for example a sunroof in a car, the roof of a conservatory of a house, a skylight in a building etc. Although the techniques described herein are therefore particularly effective for forward-facing, sideways-facing, and backwards-facing cameras, they may be used in relation to downward-facing and/or upwards-facing cameras or other types of camera.

The camera 105 is operable to capture image data corresponding to a first representation of a scene and to output the captured image data. The scene is within the field of view of the camera 105.

The scene includes one or more items. For convenience and brevity, in this specific example, the one or more items comprise a window, it being understood that the item(s) may be of another type, as described herein or otherwise. The scene may include more than one window. Where the scene includes more than one window, the techniques described herein may be applied to some or all of the windows. For example, the UAV 100 may be configured to apply the techniques described herein to all windows included in the scene. In other examples, there may be a degree of selection. For example, the UAV 100 may be configured to apply the techniques described herein only to any windows for which consent to capture image data has not been provided and/or not to apply the techniques described herein to any windows for which consent to capture image data has been provided.

A window is an opening that comprises a window pane through which light can pass. A window may comprise multiple window panes. A window pane may be made from glass, plastics etc. The window pane may have a frosted effect, for example using frosted glass and/or frosted window film.

Some types of window can be opened and closed and other types of window remain closed and cannot be opened.

A window may be provided in a wall, a building, a vehicle etc.

A window may comprise a window frame. The window frame supports the window pane. A window frame may be made from wood, aluminium, unplasticised polyvinyl chloride (uPVC) etc.

A window may comprise a glazing bar. A glazing bar is a bar or strip between adjacent window panes in a window. A glazing bar is sometimes known as a 'muntin', 'mullion', or 'sash bar'.

A window may comprise a window covering. A window covering comprises material that covers a window to manage sunlight, thermal insulation and/or sound insulation, and/or to provide weatherproofing, privacy, security and/or decorative effect etc. Examples of window coverings include, but are not limited to, curtains, window blinds and window shutters.

A window may comprise window furniture. Examples of window furniture include, but are not limited to, window handles and window locks.

A window may comprise a windowsill. A windowsill is a ledge forming a bottom part of a window.

A part of the scene is visible through the window. Where, for example, the scene includes a window in a building, the scene also includes any objects, such as people, that are visible through the window. Such objects correspond to the part of the scene that is visible through the window.

The UAV 100 comprises an image processor 110. The image processor 110 is communicatively coupled to the camera 105, for example via a bus. In this specific example, the UAV 100 comprises a single image processor 110, but in other examples the UAV 100 comprises more than one image processor.

The image processor 110 may be arranged to execute computer-readable instructions comprised in a computer program and, thus, to cause the methods and techniques described herein to be performed. The computer program may be stored in memory of the UAV 110 and/or in other non-transitory computer-readable media.

The image processor 110 is configured to receive the captured image data output by the camera 105. In some examples, the image processor 110 receives the captured image data directly from the camera 105. In other examples, the image processor 110 receives data based on the captured image data output by the camera 105. For example, the captured image data output by the camera 105 may be processed by one or more entities intermediate the camera 105 and the image processor 110 prior to receipt of the data based on the captured image data by the image processor 110. Such processing by the one or more intermediate entities may comprise image enhancement, object recognition, object classification and/or object localisation, etc. Alternatively or additionally, the image processor 110 may perform all or part of such processing.

Whereas the captured image data image output by the camera 105 corresponds to the first representation of the scene, the image processor 110 is configured to generate image data corresponding to a second, different representation of the scene.

The part of the scene that is visible through the window in the first representation of the scene is represented differently in the first and second representations of the scene. In other words, the way in which the part of the scene that is visible through the window is represented in the first representation of the scene is different from the way in which the part of the scene that is visible through the window is represented in the second representation of the scene. For example, the part of the scene that is visible through the window in the first representation of the scene may be represented in a visually different manner in the first and second representations of the scene to provide privacy in relation to the part of the scene that is visible through the window in the first representation of the scene.

People behind a window may feel that they have a relatively high degree of privacy compared to people not behind a window. For example, a person in their own home may feel that they are entitled to a higher degree of privacy than if they were walking in the street (where, for example, closed-circuit television (CCTV) may be prevalent). As such, the privacy-enhancing measures described herein may afford a person a higher degree of privacy than they might otherwise have in environments in which such additional privacy would be beneficial. The techniques described herein may enhance privacy where image data is being captured intentionally and/or where such image data is being captured inadvertently.

In addition to personal privacy concerns, there may be concerns around UAVs capturing image data of, for example, the inside of buildings through windows for nefarious purposes. For example, such image data may be used to identify valuable items within a property.

Other types of privacy concerns may be applicable. For example, there may be concerns around UAVs capturing image data of, for example, the inside of an office through windows where the office contains confidential materials, such as confidential paperwork etc. There may be concerns around UAVs capturing image data of, for example, the inside of a government building where the building contains sensitive documents. There may be concerns around UAVs capturing image data of, for example, schools where children are present.

As indicated above, although in this specific example, the item in the scene comprises a window, the item may be of a different type. Privacy, security and/or related concerns can exist in relation to types of items other than windows.

Another part of the scene that is not visible through the window in the first representation of the scene may be represented in the same manner in the first and second representations of the scene. The other part may, for example, be an outside of a building having the window. In such cases, the privacy considerations in relation to the exterior appearance of the building may be lower than for a person that is visible through the window. In some cases, there may be no privacy considerations in relation to the exterior appearance of the building. In some cases, it may be positively desirable for the exterior appearance of the building to be represented in the same manner in the first and second representations of the scene.

A window may be recognised in various different ways.

For example, a window may be recognised by the presence of one or more predetermined objects associated with a window. Examples of such predetermined objects include, but not limited to, a window pane, a window frame, a glazing bar, a window covering, window furniture, a windowsill etc. By recognising such a predetermined object, the presence of a window may be inferred. The location of the window may also be inferred.

Alternatively or additionally, a predetermined object may be placed near to, on, in and/or behind a window to indicate the presence of the window. As such, the predetermined may not be part of a window. Such a predetermined object may comprise a predetermined privacy indicator. For example, a predetermined pattern and/or symbol and/or code may be affixed in relation to the window, for example using adhesive. This may facilitate recognition of the presence of a window.

Alternatively or additionally, a predetermined object may be part of an object in which the window is provided. For example, the predetermined object may be a brickwork pattern, window pediment, window surround, etc, which is indicative of the presence of a window.

The UAV 100 may be configured to perform object recognition to recognise the presence of a window in a scene, based, for example, on the presence of one or more such predetermined objects in the scene.

The UAV 100 may be trained to recognise the presence of a window in a scene using machine learning or in another manner. Recognising the presence of the window in the scene may comprise identifying a location of the window in the scene. For example, the UAV 100 may be trained with one or more sets of image data representing a scene comprising one or more windows and/or one or more sets of image data representing a scene not comprising one or more window and/or one or more sets of image data representing a scene comprising an item other than a window. The UAV 100 may thereby learn how to recognise the presence of a window in a scene. Although, in some examples, the UAV 100 may be trained to recognise the presence of a window in a scene, in other examples, the UAV 100 may be pre-configured with data resulting from such learning so that the UAV 100 can recognise the presence of a window in a scene without having to be trained itself. Use of machine learning to recognise the presence of a window in a scene may involve use or one or more trained Artificial Neural Networks (ANNs). An example of an ANN is a Convolutional Neural Network (CNN).

The image processor 110 may perform such object recognition and/or such object recognition may be performed by another component of the UAV 100 and/or by another component in a system in which the UAV 100 is comprised. As such the image processor 110 may recognise the presence of a window in a representation of a scene itself and/or may receive data that indicates the presence of a window in a representation of a scene.

As mentioned above, the camera 105 may be configured to capture electromagnetic radiation in the infrared part of the electromagnetic spectrum. The image processor 110 may perform object recognition based at least in part on a thermal property of the predetermined object. The thermal property of the predetermined object may be determined based on captured electromagnetic radiation in the infrared part of the electromagnetic spectrum. For example, such captured image data may represent items in the captured image data differently based on their thermal properties. An example of such a thermal property is heat loss. The captured image data may represent items in different colours according to heat loss, for example. As such, the image processor 110 may be able to recognise the predetermined object based on the heat loss associated with the predetermined object. The image processor 110 may be able to recognise the predetermined object based on the heat loss of the predetermined object relative to a threshold heat loss, relative to a heat loss of at least one other item etc. For example, the image processor 110 may be able to recognise a window based on its heat loss relative to its surroundings. For example, a window in a building may be recognised by a relatively high heat loss compared to that of a wall (for example a façade) of the building. In another example, a window may be recognised by recognising heat leakage associated with the window. For example, heat leakage may occur at the window frame, the window sash etc, whereas the glass component of the window may have relatively low heat leakage. The window frame, having the relatively high heat leakage compared to one or more glass panes held in the frame and a surrounding building façade may indicate the presence of the window.

As indicated above, the camera 105 may be configured to capture electromagnetic radiation in both the visible light and infrared parts of the electromagnetic spectrum. The camera may comprise multiple sensors, with one sensor being arranged to capture visible light and the other being arranged to capture infrared, for example. The image processor 110 may be configured to use the captured image data corresponding to the infrared part of the electromagnetic spectrum to recognise an item, for example a window. As explained above, this may be based on heat loss analysis. The image processor 110 may provide privacy-enhanced image processing in relation to the captured image data corresponding to the visible part of the electromagnetic spectrum based on the recognition of the item using the captured image data corresponding to the infrared part of the electromagnetic spectrum. The image processor may map a location of an item in the scene represented by the captured image data corresponding to the infrared part of the electromagnetic spectrum to a corresponding location in the captured image data corresponding to the visible light part of the electromagnetic spectrum to identify the location of the item in the captured image data corresponding to the visible light part of the electromagnetic spectrum. As such, the UAV 100 may use multiple different types of captured image data to recognise and to obscure an item.

The UAV 100 may be able to recognise the presence of the window in other ways. For example, the UAV 100 may be configured with a map indicating known locations of windows. Where the UAV 100 captures image data representing one or more of the known locations, the UAV 100 can provide privacy-enhanced image processing as described herein.

In some examples, the UAV 100 recognises the presence of the window automatically, without requiring any user input. For example, the image processor 110 may be able to recognise the presence of the window without requiring any user input between the image processor 110 receiving the captured image data corresponding to the first representation of the scene and the image processor 110 generating the image data corresponding to the second representation of the scene. This may reduce latency in being able to output the image data, since the image processor 110 is not dependent on user input. This may be particularly effective where use of user input would involve receiving input from a remote user over a wireless connection, which may be subject to not insignificant delays. This may also be particularly effective for live (or 'real-time') video data where latency reduction may be especially desirable. This may also provide enhanced user experience since user input may be bypassed while still providing privacy enhancement as described herein.

The image processor 110 is configured to output the generated image data. The image processor 110 may output the generated image data for storage in memory of the UAV 100 and/or for transmission to one or more other entities.

The generated image data may be viewed on a display on a device other than the UAV 100. For example, the generated image data may be viewed in real-time on a display device used by a human operator of the UAV 100. The display device may comprise a headset, a control device, a smartphone, a tablet computing device, a wearable device, etc. The human operator may control the UAV 100 based on a first-person view (FPV) (or 'remote-person view (RPV)') and may be able to navigate and control the UAV 100, while still providing privacy-enhancement for items in the FPV stream.

The image processor 110 may be configured to output some or all of the captured image data, for example for storage in memory of the UAV 100 and/or for transmission to one or more other entities.

The image processor 110 may output all of the captured image data such that the original version of the representation of the scene may be obtained. As such, the image processor 110 may make both an original representation and a privacy-enhanced representation of the scene available.

The image processor 110 may output the part of the captured image data that corresponds to the part of the scene that is visible through the window. As such, the image processor 110 may make a privacy-enhanced representation of the scene available but may also make available the part of the scene in relation to which privacy was enhanced.

The image processor 110 may be configured to perform at least the receiving of the captured image data, the generating of the image data corresponding to the second, different representation of the scene, and the outputting of the generated image data while the UAV 100 operates in an autonomous mode. However, one or more further actions taken by the image processor 110 and/or the UAV may be performed while the UAV 100 operates in an autonomous mode.

The captured image data and/or the generated image data may comprise still image data and/or video data.

As such, the UAV 100 is configured to perform such privacy-enhancing image processing in relation to captured image data. The term 'privacy-enhancing image processing' is used herein to mean processing captured image data such that a part of a scene in a first representation of the scene (which corresponds to the captured image data) is represented differently in a second representations of the scene (which corresponds to generated image data). The part of the scene may correspond to part of the scene that is visible through a window or otherwise.

The UAV 100 may be configured to perform such privacy-enhancing image processing for all image data captured by the camera 105. For example, it may be a legal requirement that all image data captured by the camera 105 be subject to such processing.

The UAV 100 may be configured to perform such privacy-enhancing image processing based on user-configuration. For example, a user, operator, owner or other entity associated with the UAV 100 may specify when such privacy-enhancing image processing is to be applied. For example, such privacy-enhancing image processing may be applied in a predetermined location, at a predetermined time, at a predetermined altitude etc. Such user-configuration may be provided before or after the image data is captured.

Figure 2:
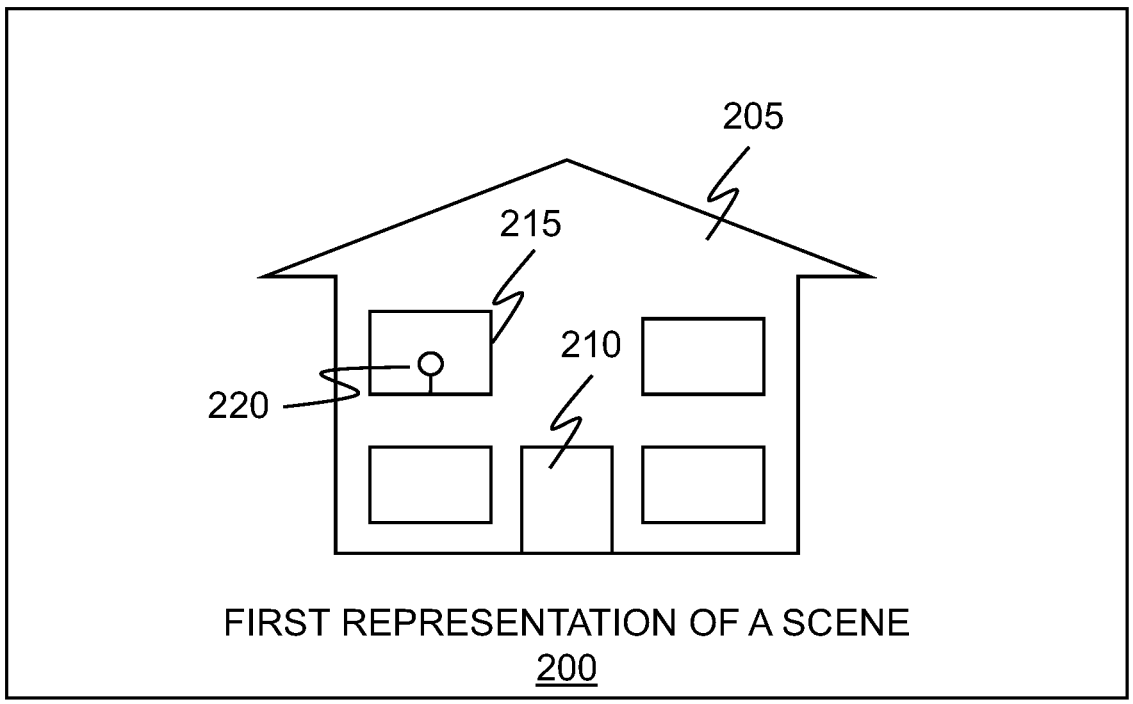
FIG. 2 shows a schematic representation of a first representation of a scene in accordance with embodiments.

Referring to FIG. 2, there is shown schematically an example of a first representation 200 of a scene. The first representation 200 corresponds to image data captured by the camera 105 of the example UAV 100 described above with reference to FIG. 1.

In this example, the scene includes a building 205. In this example, the building 205 has a door 210. In this example, the building 205 has four windows, one of which is indicated in FIG. 2 by reference numeral 215. In this example, the building 205 has an occupant 220 who is visible through one of the windows 215.

In the first representation 200, the occupant 220 has limited, if any, privacy. The occupant 220 may not know that they have been represented in the image captured by the UAV 100 and/or may not have consented to being present in the image captured by the UAV 100.

Figure 3:
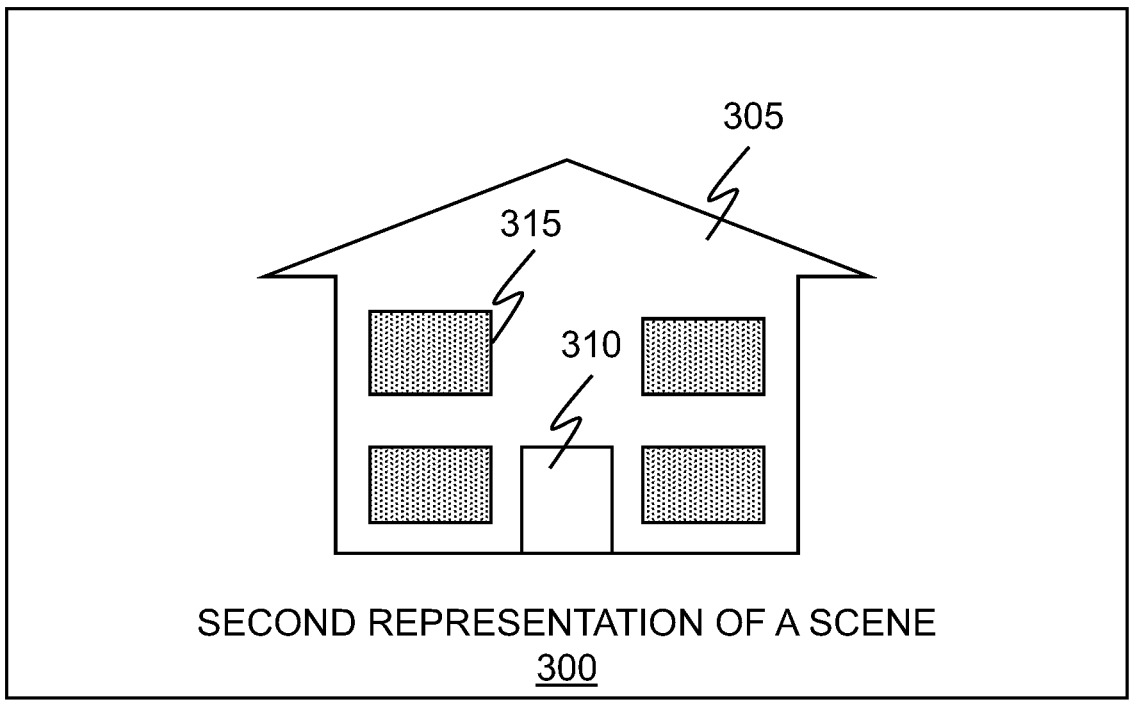
FIG. 3 shows a schematic representation of a second representation of a scene in accordance with embodiments.

Referring to FIG. 3, there is shown schematically an example of a second representation 300 of a scene. The second representation 300 corresponds to image data generated by the image processor 110 of the UAV 100 described above with reference to FIG. 1.

Similarly to the first representation 200 described above with reference to FIG. 2, the second representation 300 includes the same building 305, the same entrance door 310 and same the four windows 315. However, the occupant 220 who is visible through one of the windows 215 in the first representation 200 is not visible in the second representation 300.

In the second representation 300, the occupant has enhanced privacy compared to the first representation 200. In particular, since the occupant is not visible in the second representation 300, the occupant has an increased level of privacy compared to the first representation 200, even if they did not know that they had been represented in the image data captured by the UAV 100 and/or did not consent to being present in the image data captured by the UAV 100.

In this example, none of the part of the scene that is visible through the windows 215 in the first representation 200 is visible in the second representation 300. As such, in this example, the (entire) part of the scene that is visible through the window 215 in the first representation 200 is represented differently in the first and second representations 200, 300 of the scene, to provide privacy.

Unlike the part of the scene that is visible through the windows 215 in the first representation 200 and is represented differently in the second representation 300, all other parts of the scene are, in this example, represented in the same manner in the first and second representations 200, 300.

Figure 4:
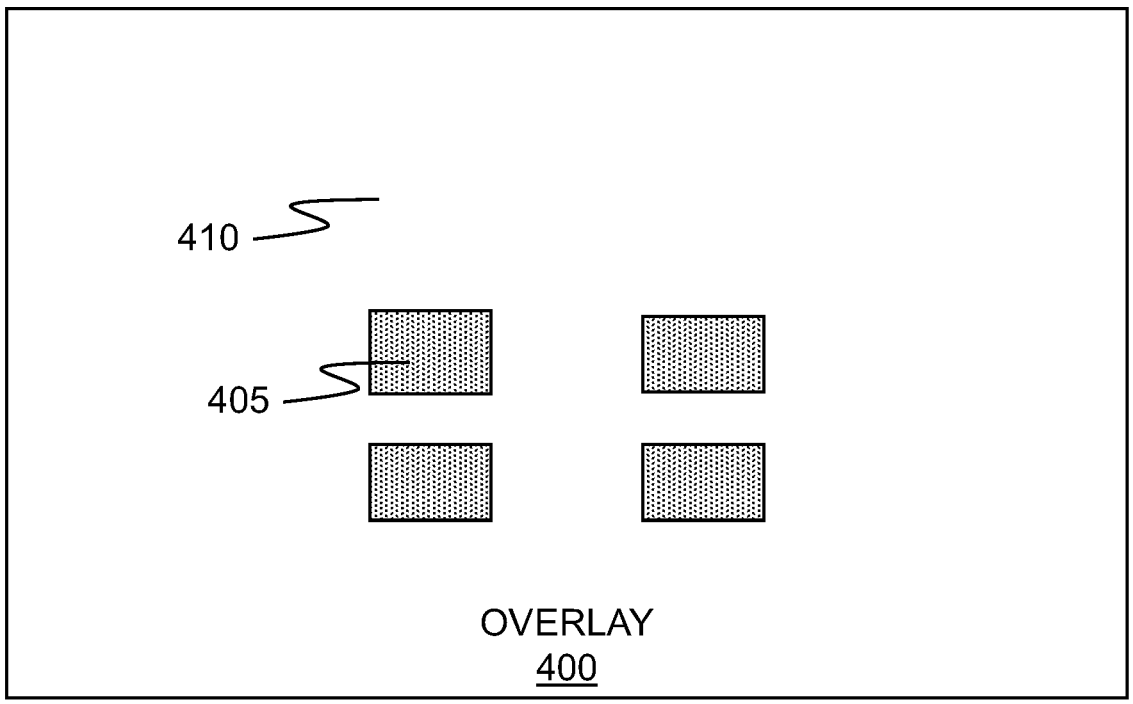
FIG. 4 shows a schematic representation of an overlay in accordance with embodiments.

Referring to FIG. 4, there is shown schematically an example of an overlay 400.

In this example, the image processor 110 uses the first representation 200 and the overlay 400 to obtain the second representation 300.

In this example, the image processor 110 is configured to generate overlay data corresponding to the overlay 400. The overlay 400 is for the first representation 200. In particular, the overlay 400 is to be overlaid over the first representation 200.

In this example, the overlay is arranged to obscure the part of the scene that is visible through the windows 215 in the first representation 200. In this example, the overlay 400 includes a plurality of obscuring regions, one of which is indicated in FIG. 4 by reference numeral 405. Each obscuring region 405 corresponds to a respective window 215 in the first representation 200. In this example, each obscuring region 405 corresponds to a respective window 215 in the first representation 200 of the scene on the basis that it is of the same size and is in the same location in the scene as its respective window.

In this example, the overlay 400 is arranged not to obscure the part of the scene that is not visible through any of the windows 215 in the first representation. In this example, the overlay 400 includes a non-obscuring region 410. The non-obscuring region 410 may be transparent. In this example, the non-obscuring region 410 is the region of the overlay 400 that does not include any obscuring regions 405. The non-obscuring region 410 may be seen to be the complement of the obscuring regions 405 in the overlay 400.

By overlaying the overlay 400 over the first representation 200, the image processor 110 may obtain the second representation 300.

Although, in this example, the image processor 110 generates the second representation 300 using the first representation 200 of the scene and the overlay 400, in other examples the image processor 110 generates the second representation 300 in a different manner.

In some such examples, the image processor 110 is configured to modify the image data corresponding to the first representation of the scene so that the part of the scene that is visible through the windows 215 in the first representation 200 is represented differently in the first and second representations 200, 300. For example, the image processor 110 may be configured to modify some of the pixel values in the image data corresponding to the first representation 200, without the use of an overlay 400.

The image processor 110 may pixelate the part of the scene that is visible through the windows 215 in the first representation 200 such that the part of the scene that is visible through the windows 215 in the first representation 200 is represented in a non-pixelated manner in the first representation 200 and is represented in a different, pixelated manner in the second representation 300. Pixelating the part of the scene that is visible through the windows 215 in the first representation 200 provide privacy in relation to that part of the scene.

The image processor 110 may remove (or 'delete' or 'cut') the part of the scene that is visible through the windows 215 in the first representation 200 such that the part of the scene that is visible through the windows 215 in the first representation 200 is represented by a void (or absence of detail) in the second representation 300. The part of the scene that is visible through the windows 215 in the first representation 200 is therefore represented in its original form in the first representation 200 of the scene and is represented differently, by a void (or lack of inclusion), in the second representation 300. Removing the part of the scene that is visible through the windows 215 in the first representation 200 provides privacy in relation to that part of the scene.

Various measures (for example UAVs, methods, computer programs, image processors, systems) are provided in which a camera (provided in a UAV) is operable to output captured image data corresponding to a first representation of a scene within a field of view of the camera. The scene includes a window. An image processor (provided in the UAV or otherwise) is configured to receive the captured image data output by the camera. The image processor is configured to generate image data corresponding to a second, different representation of the scene. A part of the scene that is visible through the window in the first representation of the scene is represented differently in the first and second representations of the scene. The image processor is configured to output the generated image data. Such measures enable the image processor to represent the part of the scene visible through the window differently, to provide privacy-enhanced image processing or otherwise.

The part of the scene may be represented differently in the first and second representations of the scene to provide privacy in relation to the part of the scene. As such, privacy-enhanced image processing may be provided.

The image processor may be configured to generate the image data corresponding to the second representation of the scene by generating overlay data corresponding to an overlay for the first representation of the scene and overlaying the overlay over the first representation of the scene to obtain the second representation of the scene. The overlay may be arranged to obscure the part of the scene that is visible through the window in the first representation of the scene. As such, the image processor can represent the part of the scene visible through the window differently by applying an overlay to the captured image data. Such processing may provide a relatively high degree of privacy since it may be difficult for a third party to reverse the privacy-enhancing process to reveal what was visible through the window in the first representation of the scene. For example, the overlay may comprise a mask configured to cover what was visible through the window in the first representation of the scene such that information relating to what was visible through the window in the first representation of the scene is not present in and/or is not recoverable from the generated image data corresponding to the second representation of the scene. However, using an overlay may involve additional processing resources and/or may degrade image quality compared to modifying the way in which what was visible through the window in the first representation is depicted in the second representation of the scene.

The overlay may comprise an obscuring region corresponding to the part of the scene that is visible through the window in the first representation of the scene such that, when the overlay is overlaid over the first representation of the scene, the obscuring region obscures the part of the scene that is visible through the window in the first representation of the scene. As such, enhanced privacy may be selectively provided to the part of the scene in which enhanced privacy is likely to be most effective.

The overlay may comprise a non-obscuring region corresponding to a further part of the scene that is not visible through the window in the first representation of the scene such that, when the overlay is overlaid over the first representation of the scene, the non-obscuring region does not obscure the further part of the scene that is not visible through the window in the first representation of the scene. As such, enhanced privacy may be selectively provided to the part of the scene in which enhanced privacy is likely to be most effective while another part of the scene in which enhanced privacy is likely to be less effective is not subject to enhanced-privacy image processing.

The image processor may be configured to generate the image data corresponding to the second representation of the scene by modifying the image data corresponding to the first representation of the scene so that the part of the scene that is visible through the window in the first representation of the scene is represented differently in the first and second representations. As such, the image processor can represent the part of the scene visible through the window differently by modifying the representation of that part of the scene. Such processing may provide a relatively efficient form of privacy-enhancement where additional data (for example overlay data) is not used. However, it may be more possible for a third party to reverse the privacy-enhancing process to reveal what was visible through the window in the first representation of the scene, for example depending on the type and strength of pixilation used.

The image processor may be configured to modify the image data corresponding to the first representation of the scene by pixelating the part of the scene that is visible through the window in the first representation of the scene. Pixilation may provide a degree of privacy-enhancement with limited detraction from the overall view of the scene in contrast, for example, to removing the representation of what is visible through the window altogether. However, it may be possible to reverse the pixilation process to reveal the original information, for example depending on the type and strength of pixilation used.

The image processor may be configured to modify the image data corresponding to the first representation of the scene by removing the part of the scene that is visible through the window in the first representation of the scene. This may provide more security than pixilation since it may not be possible to reveal or recover the original information. However, removing such detail from a scene may detract from enjoyment and/or usability of the captured image data.

The image processor may be operable to generate the image data corresponding to the second representation of the scene in response to recognising a predetermined object in the first representation of the scene, the predetermined object in the first representation of the scene being indicative of the presence of the window in the first representation of the scene. As such, reliability may be enhanced by focusing the privacy-enhancing image processing on the part of the scene in which privacy enhancement may be most effective.

The predetermined object may comprise a window pane, a window frame, a glazing bar, a window covering, window furniture and/or a windowsill. As such, recognition of the presence of a window in the scene may be enhanced, for example in terms of accuracy, time etc.

The image processor may be configured to recognise the presence of the window in the first representation of the scene without requiring any user input between the image processor receiving the image data corresponding to the first representation of the scene from the camera and the image processor generating the image data corresponding to the second representation of the scene. As such, the presence of the window may be recognised automatically, which may reduce latency and/or improve user experience etc.

The camera may comprise a forward-facing camera. Image data captured by a forward-facing camera is especially likely to comprise representations of windows. As such, the techniques described herein may be especially effective.

The image processor may be operable to disable privacy-enhancing image processing in relation to a given item in representation of a scene in response to user-selection of a privacy-enhancing image processing override function, the image data being captured at a predetermined time of day and/or predetermined day of the week, the UAV being in a predetermined location, the UAV being above a predetermined altitude, and/or the camera having one or more predetermined camera properties. Where the given item is a given window, the image processor may be operable to disable privacy-enhancing image processing in relation to the given window in representation of a scene in response to the given window being a predetermined type of window, the given window being covered, As such, processing resources involved in providing privacy-enhancing image processing may be used more selectively.

Various measures (for example UAVs, methods, computer programs, image processors, systems) are provided in which a UAV comprises a camera operable to output captured image data corresponding to a first representation of a scene within a field of view of the camera. The scene includes a window. An image processor is provided (in the UAV or otherwise). The image processor is configured to receive the captured image data output by the camera. The image processor is also configured to recognise a part of the scene that is to be subject to privacy-enhancing image processing. The image processor is also configured to generate image data corresponding to a second, different representation of the scene. A part of the scene is represented differently in the first and second representations of the scene to enhance privacy in relation to the part of the scene. The image processor is also configured to output the generated image data. As such, privacy enhancement may be provided in a wider range of scenarios than just in relation to objects visible through a window.

Various measures (for example UAVs, methods, computer programs, image processors, systems) are provided in which a UAV is configured to perform on-board privacy-enhanced image processing of image data captured by a camera of the UAV. As such, privacy may be enhanced in relation to image data captured by the UAV on-board the UAV such that privacy-enhancement is already applied before corresponding image data leaves the UAV. This may provide a security feature in that, even if such image data is intercepted after it has left the UAV, it will already have privacy-enhancement applied to it.

Various measures (for example UAVs, methods, computer programs, image processors, systems) are provided in which a system comprises a UAV. The system is configured to perform privacy-enhanced image processing of part of a scene represented by image data captured by a camera of the UAV. The part of the scene is visible through a window comprised in the scene. As such, privacy-enhanced image processing may be applied in any system comprising a UAV, even where privacy-enhanced image processing is not performed on-board the UAV itself.

Various measures (for example UAVs, methods, computer programs, image processors, systems) are provided in which a system is configured to perform privacy-enhanced image processing of part of a scene represented by image data captured by a camera in response to the system recognising that the part of the scene is visible through a window comprised in the scene. As such, privacy-enhanced image processing may be applied without using user input, with reduced latency etc.

Examples have been described above in which an image processor of a UAV receives captured image data corresponding to a first representation of a scene and generates image data corresponding to a second, different representation of the scene, where the scene includes a window and where a part of the scene that is visible through the window in the first representation of the scene is represented differently in the first and second representations of the scene.

Other, more general, examples are envisaged in which an image processor of a UAV receives captured image data corresponding to a first representation of a scene and generates image data corresponding to a second, different representation of the scene, where a part of the scene is represented differently in the first and second representations of the scene. The part of the scene may correspond to a part of the scene that is visible through a window, or may correspond to something else. In other words, part of the scene that is associated with a window, or any other item, in a scene may be represented differently in the first and second representations of the scene.

In accordance with some examples, the part of the scene may correspond to advertising material. The item with which the advertising material is associated may be a billboard (also known as 'hoarding'). As such, a predetermined object indicative of the presence of the billboard in a scene may be recognised and the advertising material associated with the billboard may be represented differently in the first and second representations of the scene. The predetermined object may, for example, comprise a frame of the billboard, the name of an advertising company on the frame of the billboard etc. This may be effective, for example, where a UAV is involved in a live broadcast on a broadcasting channel that has restrictions on advertising.

In accordance with some examples, the part of the scene may correspond to a sensitive location. The item with which the sensitive location is associated may be a school or government facility. As such, a predetermined object indicative of the presence of the school or government facility in a scene may be recognised and the sensitive location associated with the school or government facility may be represented differently in the first and second representations of the scene. The predetermined object may, for example, comprise a school entrance sign etc. This may be effective, for example, where a UAV inadvertently captures image data representing a scene comprising such data, where such data is not useful to an entity associated with the UAV. Such data can, for example, be automatically removed or modified on-board the UAV so that the entity associated with the UAV need not process, for example remove, such data manually.

In accordance with some examples, the part of the scene may correspond to identification information. The item with which the identification information is associated may be a payment card, driving license, passport etc. As such, a predetermined object indicative of the presence of the payment card, driving license, passport etc. in a scene may be recognised and the identification information associated with the payment card, driving license, passport etc. may be represented differently in the first and second representations of the scene. Examples of payment cards include, but are not limited to, debit cards and credit cards. The predetermined object may, for example, comprise a physical card having a specific size and/or shape associated with a payment card. This may be effective, for example, where a UAV inadvertently or intentionally captures image data representing a scene comprising such identification information. Such identification information can, for example, be automatically removed or modified on-board the UAV so that an entity associated with the UAV need not process, for example remove, such identification information manually, where, for example, such identification information is inadvertently captured. Such identification information can, for example, be automatically removed or modified on-board the UAV so that an entity associated with the UAV cannot determine identification information, where, for example, such identification information is intentionally captured. Since, for example, some payment cards comprise significant amounts of identification information on one face of the payment card, capturing of such information by a UAV may represent a significant privacy, fraud etc concern. In particular, while some payment cards include a Card Verification Value (CVV) on a rear face of the payment card, other payment cards include a CVV on a front face of the payment card. Payment cards that include the CVV on the front face of the payment card alongside other identification information, such as card number, expiration date, cardholder name etc may be particularly susceptible to privacy concerns.

The image processor may be arranged to recognise the part of the scene as one that should be represented differently in the first and second representations of the scene based on object-recognition or in another manner.

Examples have been described above in which privacy-enhanced image processing is performed in relation to a UAV. Other examples are envisaged in which a system (whether or not used in relation to a UAV) is configured to perform at least some of the privacy-enhanced image processing techniques described herein. Such a system may be provided on a vehicle, a ground-based robotic system, a smartphone, a tablet computing device, a DSLR camera, a video camera, etc. Such a system may be configured to perform privacy-enhanced image processing of part of a scene represented by image data captured by a camera in which the privacy-enhanced image processing is performed in response to the system recognising that the part of the scene is visible through a window comprised in the scene.

In some examples, privacy-enhanced image processing is mandatory for all captured image data.

In other examples, an override (or 'disable') function is provided. The override function may enable privacy-enhancing image processing to be disabled in relation to all of part of a scene (for example corresponding to a window in the scene) in response to one or more criteria being met. This may provide efficient resource management such that the processing resources used for privacy-enhancing image processing are used more selectively. This may be especially beneficial for UAVs where power consumption is a consideration.

For example, a user may be able to disable privacy-enhancing image processing temporarily or permanently. Where privacy-enhancing image processing is not mandated, a user may be able to select whether privacy-enhancing image processing is active (for example such that data protection burden may be reduced) or inactive (for example where there are legitimate reasons for obtaining the captured image data).

Privacy-enhancing image processing may be disabled in relation to a predetermined type of window. For example, privacy-enhancing image processing may not be applied to windows below a threshold size, stained-glass windows, frosted glass windows etc. on the basis that the impact on privacy is very low.

Privacy-enhancing image processing may be disabled in relation to the window being covered. For example, privacy-enhancing image processing may not be applied to windows that are covered (for example by blinds, curtains etc.) on the basis that the impact on privacy is very low. As such, the presence of a window may be recognised, but the representation of the window in the second representation of the scene may be the same as the representation of the window in the first representation of the scene.

Privacy-enhancing image processing may be disabled in relation to a predetermined time of day, day of week etc. For example, privacy-enhancing image processing may not be applied at night where a UAV comprises a visible light camera and no infrared/night vision camera.

Privacy-enhancing image processing may be disabled in relation to the UAV being in a predetermined location. For example, privacy-enhancing image processing may not be applied at night where windows are known not to be present in the location of the UAV (or the likelihood of a window being present is acceptably low), for example in a remote area.

Privacy-enhancing image processing may be disabled in relation to the UAV being above a predetermined altitude and/or based on one or more camera properties of the camera. Privacy-enhancing image processing may not be applied when the UAV is higher than a predetermined altitude on the basis that the impact on privacy would be very low given the resolution and zoom properties of the camera of the UAV.

Various modifications and alternatives will be apparent to one skilled in the art.

The following numbered clauses on pages 23 to 27 of the present description correspond to the claims of UK patent application no. 1712307.6, from which the present application claims priority, as filed. The claims of the present application as filed can be found on the subsequent pages 28 to 31 of the specification which begin with the heading "CLAIMS".

1. An unmanned aerial vehicle, UAV, comprising:
   a camera operable to output captured image data corresponding to a first representation of a scene within a field of view of the camera, the scene including a window; and
   an image processor configured to:
      receive the captured image data output by the camera;
      generate image data corresponding to a second, different representation of the scene, wherein a part of the scene that is visible through the window in the first representation of the scene is represented differently in the first and second representations of the scene; and output the generated image data.

2. A UAV according to clause 1, wherein the part of the scene is represented differently in the first and second representations of the scene to provide privacy in relation to the part of the scene.

3. A UAV according to clause 1 or 2, wherein the image processor is configured to generate the image data corresponding to the second representation of the scene by:

generating overlay data corresponding to an overlay for the first representation of the scene, the overlay being arranged to obscure the part of the scene that is visible through the window in the first representation of the scene; and overlaying the overlay over the first representation of the scene to obtain the second representation of the scene.

4. A UAV according to clause 3, wherein the overlay comprises an obscuring region corresponding to the part of the scene that is visible through the window in the first representation of the scene such that, when the overlay is overlaid over the first representation of the scene, the obscuring region obscures the part of the scene that is visible through the window in the first representation of the scene.

5. A UAV according to clause 3 or 4, wherein the overlay comprises a non-obscuring region corresponding to a further part of the scene that is not visible through the window in the first representation of the scene such that, when the overlay is overlaid over the first representation of the scene, the non-obscuring region does not obscure the further part of the scene that is not visible through the window in the first representation of the scene.

6. A UAV according to clause 1 to 5, wherein the image processor is configured to generate the image data corresponding to the second representation of the scene by modifying the image data corresponding to the first representation of the scene so that the part of the scene that is visible through the window in the first representation of the scene is represented differently in the first and second representations.

7. A UAV according to clause 6, wherein the image processor is configured to modify the image data corresponding to the first representation of the scene by pixelating the part of the scene that is visible through the window in the first representation of the scene.

8. A UAV according to clause 6 or 7, wherein the image processor is configured to modify the image data corresponding to the first representation of the scene by removing the part of the scene that is visible through the window in the first representation of the scene.

9. A UAV according to any of clauses 1 to 8, wherein the image processor is operable to generate the image data corresponding to the second representation of the scene in response to recognising a predetermined object in the first representation of the scene, the predetermined object in the first representation of the scene being indicative of the presence of the window in the first representation of the scene.

10. A UAV according to clause 9, wherein the predetermined object comprises:

a window pane;
a window frame;
a glazing bar;
a window covering;
window furniture; and/or
a windowsill.

11. A UAV according to clause 9 or 10, wherein the image processor is configured to recognise the presence of the window in the first representation of the scene without requiring any user input between the image processor receiving the image data corresponding to the first representation of the scene from the camera and the image processor generating the image data corresponding to the second representation of the scene.

12. A UAV according to any of clauses 1 to 11, wherein the camera comprises a forward-facing camera.

13. A UAV according to any of clauses 1 to 12, wherein the image processor is operable to disable privacy-enhancing image processing in relation to a given window in representation of a scene in response to:

user-selection of a privacy-enhancing image processing override function;
the given window being a predetermined type of window;
the given window being covered;
the image data being captured at a predetermined time of day and/or predetermined day of the week;
the UAV being in a predetermined location;
the UAV being above a predetermined altitude; and/or
the camera having one or more predetermined camera properties.

14. A method of controlling an unmanned aerial vehicle, UAV, comprising a camera and an image processor, the method comprising:

outputting, by the camera, captured image data corresponding to a first representation of a scene within a field of view of the camera, the scene including a window; and receiving, by the image processor, the captured image data output by the camera;

generating, by the image processor, image data corresponding to a second, different representation of the scene, wherein a part of the scene that is visible through the window in the first representation of the scene is represented differently in the first and second representations of the scene; and outputting, by the image processor, the generated image data.

15. A computer program arranged, when executed, to perform a method of controlling an unmanned aerial vehicle, UAV, comprising a camera and an image processor, the method comprising:

outputting, by the camera, captured image data corresponding to a first representation of a scene within a field of view of the camera, the scene including a window; and receiving, by the image processor, the captured image data output by the camera;

generating, by the image processor, image data corresponding to a second, different representation of the scene, wherein a part of the scene that is visible through the window in the first representation of the scene is represented differently in the first and second representations of the scene; and outputting, by the image processor, the generated image data.

16. A computer-readable medium comprising a computer program according to clause 15.

17. An image processor for use with an unmanned aerial vehicle, UAV, the image processor being configured to:

receive captured image data output by a camera of the UAV, the captured image data corresponding to a first representation of a scene within a field of view of the camera, the scene including a window;

generate image data corresponding to a second, different representation of the scene, wherein a part of the scene that is visible through the window in the first representation of the scene is represented differently in the first and second representations of the scene; and output the generated image data.

18. A system comprising:
an unmanned aerial vehicle, UAV, comprising a camera operable to output captured image data corresponding to a first representation of a scene within a field of view of the camera, the scene including a window; and
an image processor configured to:
receive the captured image data output by the camera;
generate image data corresponding to a second, different representation of the scene, wherein a part of the scene that is visible through the window in the first representation of the scene is represented differently in the first and second representations of the scene; and
output the generated image data.

19. An unmanned aerial vehicle, UAV, comprising:
a camera operable to output captured image data corresponding to a first representation of a scene within a field of view of the camera, the scene including a window; and
an image processor configured to:
receive the captured image data output by the camera;
recognise a part of the scene that is to be subject to privacy-enhancing image processing;
generate image data corresponding to a second, different representation of the scene, wherein a part of the scene is represented differently in the first and second representations of the scene to enhance privacy in relation to the part of the scene; and
output the generated image data.

20. An unmanned aerial vehicle, UAV, configured to perform on-board privacy-enhanced image processing of image data captured by a camera of the UAV.

21. A system comprising an unmanned aerial vehicle, UAV, the system being configured to perform privacy-enhanced image processing of part of a scene represented by image data captured by a camera of the UAV, the part of the scene being visible through a window comprised in the scene.

22. A system configured to perform privacy-enhanced image processing of part of a scene represented by image data captured by a camera in response to the system recognising that the part of the scene is visible through a window comprised in the scene.

What is claimed is:

1. An unmanned aerial vehicle, UAV, comprising:
a camera operable to output captured image data corresponding to a first representation of a scene within a field of view of the camera, the scene including an item; and
an image processor configured to disable privacy-enhancing image processing in response to the UAV being above a predetermined altitude and the camera having one or more predetermined camera properties, wherein said privacy-enhancing image processing comprises:
receiving the captured image data output by the camera;
in response to recognising a predetermined object indicative of the presence of the item in the first representation of the scene, generating image data corresponding to a second, different representation of the scene, wherein a part of the scene that is associated with the item in the first representation of the scene is represented differently in the first and second representations of the scene; and
outputting the generated image data.

2. The UAV of claim 1, wherein the item comprises a window and wherein the part of the scene that is associated with the item comprises a part of the scene that is visible through the window.

3. The UAV of claim 2, wherein the predetermined object comprises a window pane, a window frame, a glazing bar, a window covering, window furniture, a windowsill, a brickwork pattern, a window pediment and/or a window surround.

4. The UAV of claim 1, wherein the item comprises a payment card and wherein the part of the scene that is associated with the item comprises identification information on the payment card.

5. The UAV of claim 1, wherein the item comprises a billboard and wherein the part of the scene that is associated with the item comprises advertising material on the billboard.

6. The UAV of claim 1, wherein the part of the scene is represented differently in the first and second representations of the scene to enhance privacy in relation to the part of the scene.

7. The UAV of claim 1, wherein the recognising of the predetermined object indicative of the presence of the item in the first representation of the scene comprises using a trained Artificial Neural Network, (ANN).

8. The UAV of claim 1, wherein the camera comprises:
an upwards-facing camera;
a downwards-facing camera;
a forward-facing camera;
a sideways-facing camera; and/or
a backwards-facing camera.

9. The UAV of claim 1, wherein the image processor is configured to perform at least the receiving of the captured image data, the generating of the image data corresponding to the second, different representation of the scene, and the outputting of the generated image data while the UAV operates in an autonomous mode.

10. The UAV of claim 1, wherein the camera is configured to capture infrared electromagnetic radiation and wherein the image processor is configured to recognise the predetermined object based at least in part on a thermal property of the predetermined object.

11. The UAV of claim 10, wherein the thermal property of the predetermined object is heat loss associated with the predetermined object.

12. The UAV of claim 11, wherein the image processor is configured to recognise the predetermined object based at least in part on heat loss associated with the predetermined object relative to heat loss associated with at least one other item in the scene.

13. The UAV of claim 1, wherein the image processor is configured to recognise the presence of the item in the first representation of the scene without requiring any user input between the image processor receiving the image data corresponding to the first representation of the scene from the camera and the image processor generating the image data corresponding to the second representation of the scene.

14. The UAV of claim 1, wherein the image processor is configured to generate the image data corresponding to the second representation of the scene by:
generating overlay data corresponding to an overlay for the first representation of the scene, the overlay being arranged to obscure the part of the scene that is associated with the item in the first representation of the scene; and overlaying the overlay over the first representation of the scene to obtain the second representation of the scene.

15. The UAV of claim 14, wherein the overlay comprises:
an obscuring region corresponding to the part of the scene that is associated with the item in the first representation of the scene such that, when the overlay is overlaid over the first representation of the scene, the obscuring region obscures the part of the scene that is associated with the item in the first representation of the scene; and/or a non-obscuring region corresponding to a further part of the scene that is not associated with the item in the first representation of the scene such that, when the overlay is overlaid over the first representation of the scene, the non-obscuring region does not obscure the further part of the scene that is not associated with the item in the first representation of the scene.

16. The UAV of claim 1, wherein the image processor is configured to generate the image data corresponding to the second representation of the scene by modifying the image data corresponding to the first representation of the scene so that the part of the scene that is associated with the item in the first representation of the scene is represented differently in the first and second representations.

17. The UAV of claim 16, wherein the image processor is configured to modify the image data corresponding to the first representation of the scene by pixelating the part of the scene that is associated with the item in the first representation of the scene or by removing the part of the scene that is associated with the item in the first representation of the scene.

* * * * *